United States Patent [19]

Gale et al.

[11] Patent Number: 4,910,695
[45] Date of Patent: Mar. 20, 1990

[54] CODE CORRELATION ARRANGEMENT

[75] Inventors: Simon J. Gale, Bishop's Stortford; David S. Rothery, Emsworth, both of Great Britain

[73] Assignee: STC PLC, London, United Kingdom

[21] Appl. No.: 230,186

[22] Filed: Aug. 9, 1988

[30] Foreign Application Priority Data

Oct. 10, 1987 [GB] United Kingdom ............... 8723855

[51] Int. Cl.⁴ .................. G06J 1/00; H04L 27/06
[52] U.S. Cl. ........................... 364/604; 375/96; 375/120
[58] Field of Search ........... 364/604, 819, 602, 728.03; 341/173; 375/96, 120, 111

[56] References Cited

U.S. PATENT DOCUMENTS

| | | | |
|---|---|---|---|
| 3,510,595 | 5/1970 | Gutleber | 364/604 X |
| 3,804,518 | 4/1974 | Meyr | 364/604 X |
| 4,112,497 | 9/1978 | Fletcher et al. | 364/604 X |
| 4,479,188 | 10/1984 | De Keijzer | 364/604 X |
| 4,627,079 | 12/1985 | von der Embse | 375/96 |
| 4,689,806 | 8/1987 | von der Embse | 375/120 X |
| 4,706,263 | 11/1987 | von der Embse | 375/96 |

Primary Examiner—Joseph Ruggiero
Attorney, Agent, or Firm—Lee, Mann, Smith, McWilliams & Sweeney

[57] ABSTRACT

A code correlation arrangement comprising clock means for sampling (11) an analogue input signal, means for generating a digital code sequence (14), means for clocking (15) the code generating means synchronously with the sampling of the analogue input signal, means for digitally multiplying (12) the code sequence with the sampled analogue signal, means for digitally filtering (13) the output of the multiplying means, and means for controlling the clock phase of the code generating means to maintain phase tracking of an incoming code phase in the analogue signal by the code generating means.

4 Claims, 3 Drawing Sheets

CODE CORRELATION ARRANGEMENT

BACKGROUND OF THE INVENTION

This invention relates to a code correlation arrangement.

A known correlation arrangement includes a low pass filter for an incoming analog signal and a digital code generator, the output of which is multiplied by the filtered signal. The analog resultant is sampled at a rate appropriate to the noise bandwidth and then digitally filtered to reduce noise. It may be noted that a small amount of aliasing will occur due to sampling of the spread noise. Taking the correlation process one stage further, both the lowpass filtered analog signal and the code generator output can be sampled before they are digitally multiplied together, instead of sampling the analog multiplier resultant. Sampling before a digital multiplier will produce an identical result to sampling after an analog multiplier.

BRIEF SUMMARY OF THE INVENTION

According to the present invention there is provided a code correlation arrangement comprising clock means for sampling an analog input signal, means for generating a digital code sequence, means for clocking the code generating means synchroniously with the sampling of the analog input signal, means for digitally multiplying the code sequence with the sampled analog signal, means for digitally filtering the output of the multiplying means, and means for controlling phase tracking of an incoming code phase in the analog signal by the code generating means.

According to a preferred embodiment of the invention the means for controlling the clock phase of the code generating means comprises a numerically controlled oscillator (NCO) having a frequency control input dependent on the required code phase, the NCO being clocked by the sampling clock, and means for presenting a predetermined bit of the NCO digital output as the clock signal for the code generating means.

BRIEF DESCRIPTION OF THE DRAWINGS

Embodiments of the invention will now be described with reference to the accompanying drawings, in which.

DESCRIPTION OF PREFERRED EMBODIMENT

Figure 1:
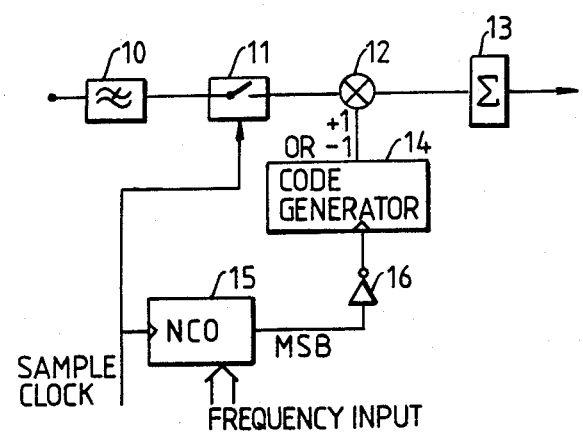
FIG. 1 illustrates a code correlation arrangement.

In the arrangement shown in FIG. 1 an analog signal modulated with coded information is passed through a low-pass filter 10 and applied to a sampling circuit 11. The sampled signal is then digitally multiplied with a synchronous code in multiplier 12. The output of multiplier 12 is finally passed through a digital filter 13 the output of which consists of the correlation samples. The synchronous code applied to multiplier 12 is produced by a code generator 14 which is clocked synchronously with the sample clock applied to circuit 11. In order to maintain an accurate phase track of the incoming code phase the code generator must follow the incoming code phase. In other words, there must be provision for adjusting the phase of the locally produced code and therefore the phase of the code generator clock, relative to the sampling clock. This is achieved by generating phase samples from a numerically controlled oscillator (NCO) 15 clocked with the sampling clock. The generated phase samples are then quantised to one bit, and then used to clock the code generator in such a way that a clock will occur every sample time that the NCO phase passes $2\pi$. It is evident that the sample clock must exceed or at least equal twice the highest code Doppler frequency if output clocks are not to be missed. For the convenience of the logic used by the applicants it was found necessary to include an inverter 16 to invert the most significant bit (MSB) before applying it to the code generator 14. Finite NCO accumulator length will result in reduced frequency resolution. The phase ramp will always be linear, implying that there will be no phase jitter.

Figure 2:
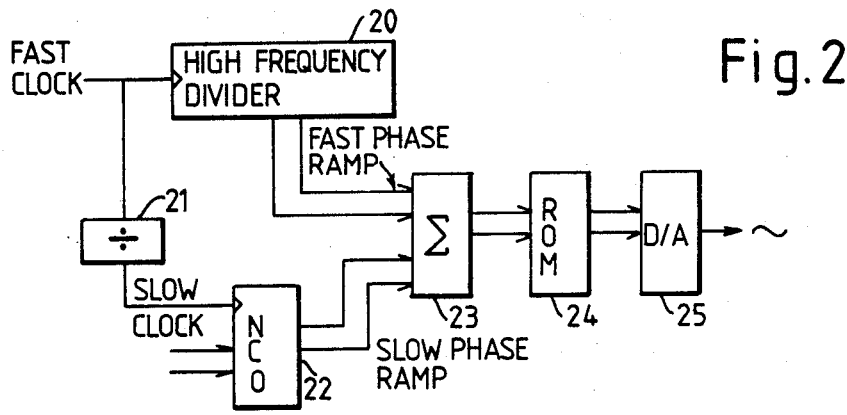
FIG. 2 illustrates a code frequency up-conversion arrangement.

There is one major problem, however, with the arrangement of FIG. 1. It is difficult to build a multi-bit NCO running in excess of 20 MHz using current CMOS technology. In a preferred embodiment of the invention, therefore, an up-conversion technique is used and this is illustrated in FIG. 2.

Figure 3:
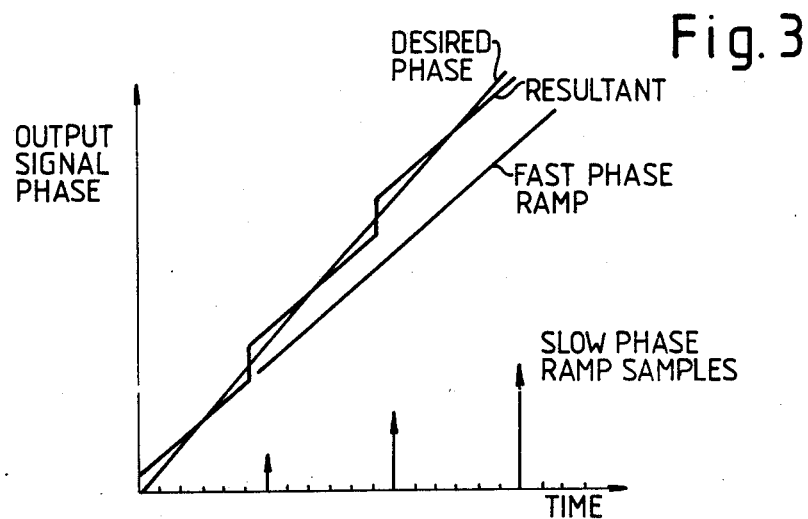
FIG. 3 illustrates trajectories associated with the arrangement of FIG. 2.

The basic up-converter arrangement utilises a fast clock applied to a high frequency divider 20 near to the required output frequency. The divider 20 is implemented as a very fast counter producing an m-bit word in parallel output form. The sample rate of this ramp is thus approximately equal to the high frequency clock, e.g. the sample clock of FIG. 1. To achieve a fine control of the ramp frequency the high frequency clock is also fed to a divider 21 to produce a slow clock which drives a slow running NCO 22. The output of NCO 22, which is also an m-bit word, is added to the output of divider 20 in a parallel adder 23. The resultant m-bit sum is used to address a ROM 24 which provides a digital representation of a sine wave. This is converted in a digital-to-analogue converter 25 to an analgoue sine wave which is then squared up to form the basic code generator clock. The associated phase trajectories are illustrated in FIG. 3. It can be seen that the resulting phase errors are a function of the slow NCO frequency and the time between phase corrections compared to the fast divider clock.

Figure 4:
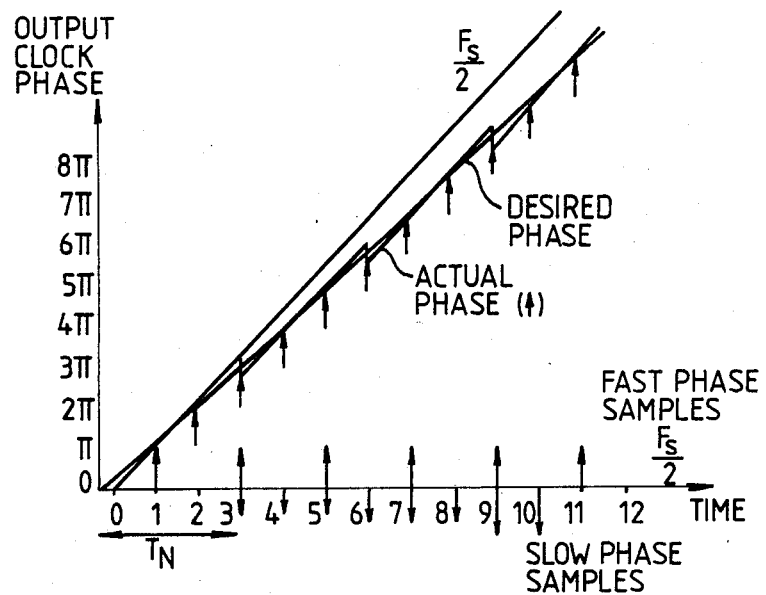
FIG. 4 illustrates phase trajectories for a modification to the arrangement of FIG. 2.

The technique may be used to generate the sampled code clock by using some simplifications. The fast phase ramp may be generated by dividing the sample clock by 2. Alternate output samples of 0 or $\pi$ will thus result. This represents a phase ramp of half the sample frequency. The ramp must therefore be slowed by subtracting an NCO phase ramp output. The resulting phase trajectory is shown in FIG. 4. It can be seen that the maximum phase error is given by $$\phi P = (9F_S - F\,\text{code}_{min}) \times T_N \times 2\pi \text{ radians}$$

where $F_S$ = sample frequency
$F_{code}$ = minimum code frequency
$T_N$ = slow NCO update time.

The required code clock waveform may be obtained by truncating the phase sum to 1 bit and inverting. The addition may be performed simply by modulo one addition of the fast phase ramp to the slow NCO MSB. The resulting circuit is an exclusive OR gate followed by an inverter. The fast phase ramp may be generated by a D-type bistable connected to toggle. A possible circuit is shown in FIG. 5.

Figure 5:
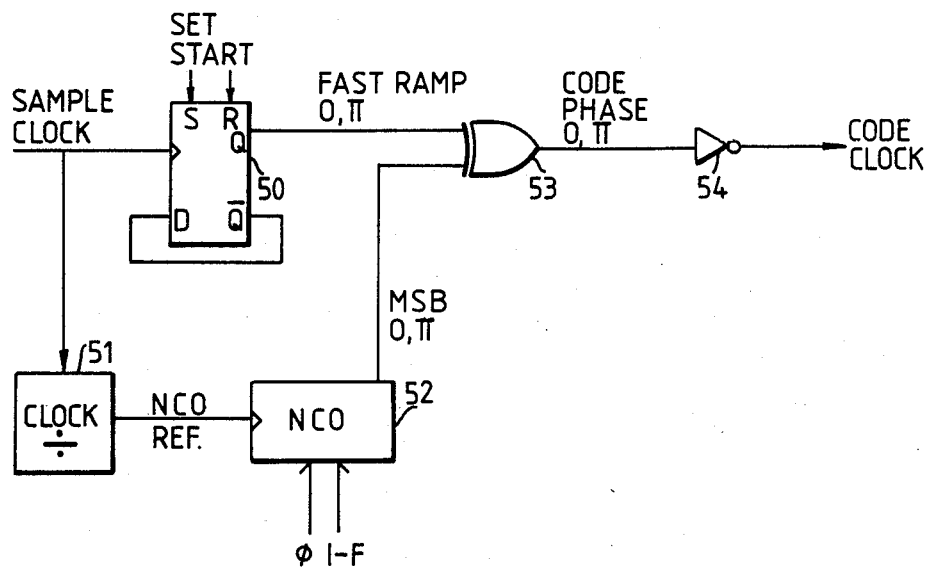
FIG. 5 illustrates a simplified up-conversion arrangement.
Figure 6:
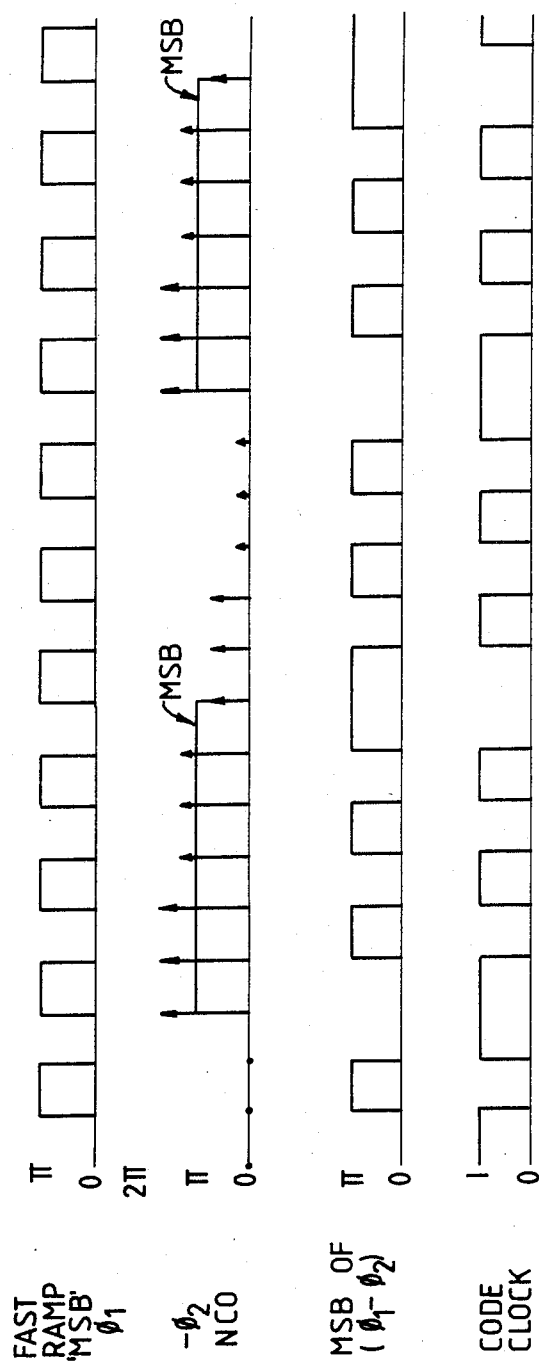
FIG. 6 illustrates waveforms associated with the arrangements of FIG. 5.

In the simplified arrangement of FIG. 5 the fast sample clock is fed to the D-type bistable 50 connected to function as a divide-by-two toggle. The fast clock is also fed to a divider 51 to produce a slow reference clock for the NCO 52. The output of the bistable 50 is summed with the most significant bit (MSB) of the NCO output in exclusive-OR gate 53 which is followed by inverter 54. It is assumed that the NCO is supplied with negative frequency input data. It must also be noted that the output would in practice need to be reclocked to remove glitches. The resultant waveforms are shown in FIG. 6. It can be seen that the clock is delayed by one sample each time the NCO phase passes $n\pi$.

We claim:

1. A code correlation arrangement comprising sampling means controlled by sampling clock means for sampling an analogue input signal containing coded information, code generating means for generating digital code sequences, clock control means for controlling the code generating means synchronously with the sampling means, multiplying means for multiplying digitally the output of the sampling means with the output of the code generating means, digital filtering means for filtering the output of the multiplying means, and means for controlling phase tracking by the code generating means of a code phase in the analogue input signal.

2. A code correlation arrangement comprising sampling means controlled by sampling clock means for sampling an analogue input signal containing coded information, code generating means for generating digital code sequences, clock control means for controlling the code generating means synchronously with the sampling means, multiplying means for multiplying digitally the output of the sampling means with the output of the code generating means, digital filtering means for filtering the output of the multiplying means, and means for controlling phase tracking by the code generating means of a code phase in the analogue input signal, wherein the means for controlling phase tracking comprises a numerically controlled oscillator (NCO) having a frequency control input dependent on the required code phase, the NCO being clocked by the sampling clock means, and means for presenting a predetermined bit of the NCO digital output as the clock control for the code generating means.

3. A code correlation arrangement comprising sampling means controlled by sampling clock means for sampling an analogue input signal containing coded information, code generating means for generating digital code sequences, clock control means for controlling the code generating means synchronously with the sampling means, multiplying means for multiplying digitally the output of the sampling means with the output of the code generating means, digital filtering means for filtering the output of the multiplying means, and means for controlling phase tracking by the code generating means of a code phase in the analogue input signal, wherein the means for controlling phase tracking comprises a numerically controlled oscillator (NCO) having a frequency control input dependent on the required code phase, the NCO being clocked by the sampling clock means, and means for presenting a predetermined bit of the NCO digital output as the clock control for the code generating means, a source of high speed clock pulses, a high frequency counter to which said high speed clock pulses are applied to produce a first m-bit word in parallel form a frequency divider to which said high speed clock pulses are also applied to produce slow speed clock pulses, a numerically controlled oscillator (NCO) to which said slow speed clock pulses are applied to produce a second m-bit word, means for adding said first and second m-bit words to produce an m-bit sum word, a read-only memory (ROM) to which said m-bit sum word is applied as an address to provide a digital representation of a sine wave, digital-to-analog conversion means to which the digital representation of the sine wave is applied to form an analog sine wave and means for squaring the analog sine wave to form the clock control for the digital code sequence generating means.

4. An arrangement according to claim 3 wherein the high frequency counter is implemented as a D-type bistable connected as a divide-by-two counter, the output of which is a one-bit word, and the adding means comprises an exclusive-OR gate to which said one-bit word is applied together with the most significant bit (MSB) of the numerically controlled oscillator.

* * * * *